(12) United States Patent
Forbes et al.

(10) Patent No.: US 10,296,677 B2
(45) Date of Patent: *May 21, 2019

(54) FIBRE OPTIC NETWORK DESIGN METHOD

(71) Applicant: Biarri Pty Ltd, Hendra, Queensland (AU)

(72) Inventors: Michael Forbes, Auchenflower (AU); Benjamin Leslie Hollis, Oxley (AU)

(73) Assignee: BIARRI PTY LTD, Hendra (AU)

(*) Notice: Subject to any disclaimer, the term of this patent is extended or adjusted under 35 U.S.C. 154(b) by 326 days.

This patent is subject to a terminal disclaimer.

(21) Appl. No.: 15/077,406

(22) Filed: Mar. 22, 2016

(65) Prior Publication Data

US 2016/0203248 A1 Jul. 14, 2016

Related U.S. Application Data

(63) Continuation of application No. 13/575,342, filed as application No. PCT/AU2011/001053 on Aug. 18, 2011, now Pat. No. 9,323,872.

(30) Foreign Application Priority Data

Aug. 18, 2010 (AU) ................ 2010903705

(51) Int. Cl.
*G06F 17/50* (2006.01)
*H04L 12/24* (2006.01)

(52) U.S. Cl.
CPC ........ *G06F 17/5009* (2013.01); *H04L 41/145* (2013.01); *G06F 17/509* (2013.01); *G06F 2217/36* (2013.01)

(58) Field of Classification Search
None
See application file for complete search history.

(56) References Cited

U.S. PATENT DOCUMENTS

| | | | |
|---|---|---|---|
| 7,958,208 B2 | 6/2011 | Manthoulis | |
| 2004/0198453 A1* | 10/2004 | Cutrer | H04W 88/085 |
| | | | 455/562.1 |

(Continued)

FOREIGN PATENT DOCUMENTS

GB     2 334 605     3/2003

OTHER PUBLICATIONS

Hamad, Ashraf M. et al., "Optimal Power-Aware Design of All-Optical Multicasting in Wavelength Routed Networks", 2004, IEEE Communications Society. (Year: 2004).*

(Continued)

*Primary Examiner* — Cedric Johnson
(74) *Attorney, Agent, or Firm* — Barnes & Thornburg LLP; G. Peter Nichols

(57) ABSTRACT

A system and method for designing a fiber optic network for a plurality of premises in a geographic area that has existing infrastructure where the existing infrastructure can be used as geographic locations for nodes and arcs in the fiber optic network. The method and system receive inputs for the fiber optic network based on allocated bandwidth, the premises in the geographic area and, data indicative of the existing infrastructure that can be used as geographic locations for nodes and said arcs in the fiber optic network, and optimizing geographic locations of nodes and arcs in the fiber optic network relative to said existing infrastructure.

21 Claims, 5 Drawing Sheets

(56) References Cited

U.S. PATENT DOCUMENTS

| | | | |
|---|---|---|---|
| 2006/0045523 A1* | 3/2006 | Kozischek | H04L 41/145 398/58 |
| 2006/0062211 A1 | 3/2006 | Manthoulis | |
| 2008/0181609 A1* | 7/2008 | Yi | H04L 41/145 398/58 |
| 2010/0003030 A1* | 1/2010 | Gilfedder | H04L 41/0856 398/67 |

OTHER PUBLICATIONS

Stanko, Stefan et al., "Implementation of Fiber Optic Cables in Sewage System", 2006, Integrated Urban Water Resources Management, Springer. (Year: 2006).*

PCT/AU2011/001053 International Search Report dated Oct. 6, 2011 (2 pages).

PCT/AU2011/001053 International Preliminary Report on Patentability dated Jul. 2, 2012 (15 pages).

PCT/AU2011/001053 Written Opinion of the International Searching Authority dated Sep. 29, 2011 (4 pages).

Hamad Ashraf M. et al., "Optimal Power-Aware Design of All-Optical Multicasting in Wavelength Routed Networks", 2004, IEEE Communications Society.

Stanko, Stefan et al., "Implementation of Fiber Optic Cables in Sewage System", 2006, Integrated Urban Water Resources Management, Springer.

Lee, Chang-Hee et al., "Fiber to the Home Using a PON Infrastructure", 2006, IEEE.

Communication and Extended European Search Report (5 pages) dated Oct. 27, 2016 out of corresponding European Application No. 11817576.9.

* cited by examiner

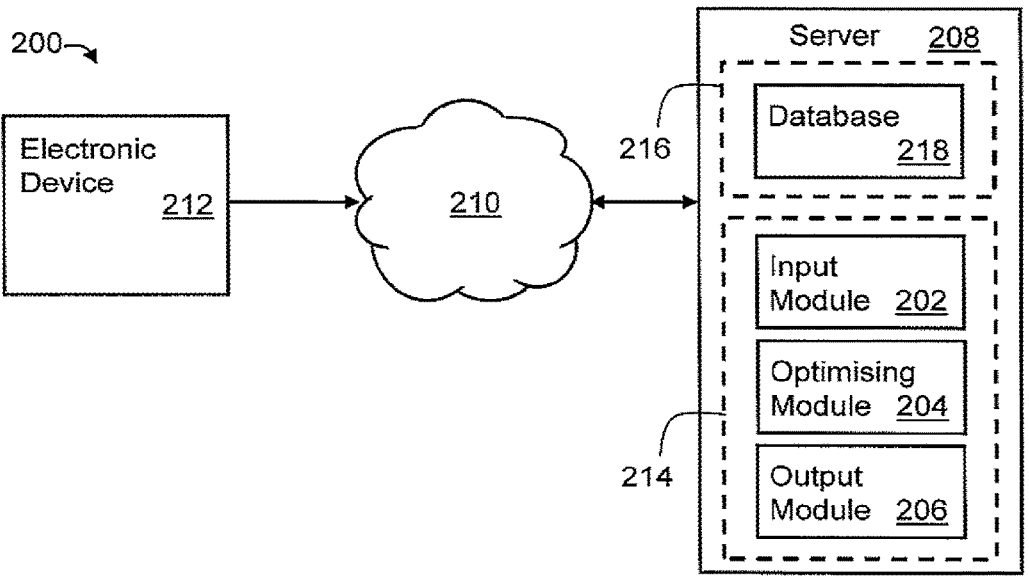

Figure 1

Receiving fibre optic network design inputs comprising data indicative of a plurality of nodes in a fibre optic network and data indicative of a plurality of arcs extending between said nodes in the fibre optic network based on allocated bandwidth for premises in a geographic area
— 222

Receiving existing infrastructure design inputs comprising data indicative of existing infrastructure for utilities in the geographic area that can be used as geographic locations for the nodes and the arcs in the fibre optic network
— 224

Generating design outputs by optimizing the geographic locations of the nodes and the arcs using the fibre optic network design and existing infrastructure inputs, whereby the design outputs comprise the optimised geographic locations of the nodes and arcs in the fibre optic network relative to the existing infrastructure
— 226

Outputting the design outputs for design of the fibre optic network
— 228

Solve for Initial FDA layout

Solve for FDAs Locating FDHs and sizing local cable

Solve FDAs and Feeder Ring

Model Input Output Information

| | Sheet Name |
|---|---|
| Location of Input/Output Data... | Optimisation |

| Data Type | Sheet Name | Range | Input_Output | Type | create_output_file |
|---|---|---|---|---|---|
| Model Parameters — 64 | Optimisation | a33:c56 | Input | Parameters | NA |
| Cable Types — 62 | CableTypes | A1:d3 | Input | Table | NA |
| Nodes — 58 | Nodes | a1:g1104 | Input | Table | NA |
| Arcs — 60 | Arcs | a1:e1087 | Input | Table | NA |
| Output Nodes — 88 | OutputNodes | a1 | Output | Table | Y |
| Output Arcs — 90 | OutputArcs | a1 | Output | Table | Y |
| Solution Summary | SolutionSummary | a1 | Output | Table | Y |
| Optimisation Progress | OptProgress | a1 | Output | Table | Y |
| Optimisation errors and warnings | ErrorsAndWarnings | a1 | Output | Table | Y |

Last Solve Statistics  9/06/2010 5:14:29 PM – 675.22(s)

Parameters...

| Parameter Name | Parameter Value | Parameter Type | | | |
|---|---|---|---|---|---|
| Use network pre-processor | Y | BOOL | | | |
| Max number of poles allowed in a preprocessed t | 3 | NUMBER | | | |
| Use network postprocessor | Y | BOOL | | | |
| Roll up to exploit tails where possible | Y | BOOL | | | |
| Enforce tube extraction rule and allow trenching | Y | BOOL | | | |
| Use Hub Selection to assist in placing FDHs | N | BOOL | | | |
| Allow Splices | N | BOOL | | | |
| Minimum number of FDHs — 70 | 0 | NUMBER | | | |
| Maximum number of FDHs | 0 | NUMBER | | | |
| Predefined FDH Set (Node IDs) | 777;861;702;955;551;820;485;39 | STRING | 777;861;702.95 | Entire Problem | 302;301;124;3;139 |
| Entry point 1 of distribution cable to FSAM (Node | 922 | NUMBER | 922 | | 922 |
| Entry point 2 of distribution cable to FSAM (Node | 205 | NUMBER | 205 | | 205 |
| FDH Capacity — 72 | 220 | NUMBER | 3;38 | SmallTest | HalfTest |
| Number of fibers per tube — 91 | 12 | NUMBER | 166 | | |
| FDH Cost — 78 | 20000 | NUMBER | 69 | | |
| Splice Enclosure cost — 80 | 5000 | NUMBER | | | |
| Individual fiber splicing cost — 82 | 11 | NUMBER | | | |
| Aerial cable installation cost per m — 84 | 25 | NUMBER | | | |
| Trenching cost per m | 110 | NUMBER | | | |
| FSAM stop solve if MIP Gap <= X% — 86 | 0 | NUMBER | | | |

FIBRE OPTIC NETWORK DESIGN METHOD

This application is a continuation of U.S. patent application Ser. No. 13/575,342 filed Jul. 8, 2013, which was a National Stage filing of International Application No. PCT/AU2011/001053 filed Aug. 18, 2011, which claimed priority to Australian Application No. 2010903705 filed Aug. 18, 2010, the entire contents of each are incorporated herein by reference.

TECHNICAL FIELD

The present invention relates to a method of designing a fibre optic network for a plurality of premises in a geographic area comprising existing infrastructure for utilities in the geographic area. This application is based on and claims the benefit of the filing date of Australian provisional patent application no. 2010903705 filed 18 Aug. 2010, the content of which, as filed, is incorporated herein by reference in its entirety.

BACKGROUND

Optical fibre can be used as a medium for telecommunication and networking because it is flexible and can be bundled as cables. It is especially advantageous for long-distance communications because light propagates through the fibre with little attenuation compared with electrical cables. In recent times, vast fibre optic networks have been commissioned to cope with the increasing growth in Internet communication and cable television.

In one existing example, fibre optic networks are designed manually with a view of ensuring that engineering and other physical requirements are met. Not only is this manual design process often laborious and time consuming, but the resulting network design is often far from ideal by including more infrastructure than is absolutely necessary, which ultimately adds to network cost. In addition, manually modifying the designed network to reduce the amount of infrastructure, or in response to changing requirements, is also a laborious and time consuming task.

SUMMARY OF THE INVENTION

According to an aspect of the present invention, there is provided a method of designing a fibre optic network for a plurality of premises in a geographic area that has existing infrastructure, the method comprising:
  electronically receiving fibre optic network design inputs comprising data indicative of a plurality of nodes in the fibre optic network and data indicative of arcs extending between said nodes in the fibre optic network based on allocated bandwidth for said premises in the geographic area;
  electronically receiving existing infrastructure design inputs comprising data indicative of said existing infrastructure that can be used as geographic locations for said nodes and said arcs in the fibre optic network;
  electronically generating design outputs by optimising geographic locations of said nodes and said arcs in the fibre optic network using said fibre optic network design inputs and said existing infrastructure inputs and using an optimisation model comprising a linear optimisation function subject to linear and integer constraints, wherein said design outputs comprise the optimised geographic locations of said nodes and said arcs in the fibre optic network relative to said existing infrastructure; and
  electronically outputting the design outputs.

It will be appreciated by those skilled in the art that the term "arc" is used herein in the manner commonly employed in this art, that is, to describe connections, for example, between nodes or between nodes and premises, and which may not describe geometrical arcs.

Typically, optimising will involve minimizing cost, subject to the design inputs, but may involve minimizing damage to the environment or maximizing average user bandwidth to the premises.

It will be appreciated by those persons skilled in the art that the data indicative of the plurality of nodes includes at least a proposed geographic location of the nodes for the fibre optic network, and a number of the nodes for the network.

In an embodiment, the existing infrastructure comprises infrastructure for utilities in the geographic area (e.g. a suburb), such as a power network and/or a telecommunications network. Thus, for example, the design of the fibre optic network comprises a layout of optimised geographic locations for nodes and arcs of the fibre optic network maximising the use of existing infrastructure, such as power poles and/or telecommunications pits and ducts, to minimise costs associated with construction of the fibre optic network. Optimisation can thus be performed with respect to one or more existing infrastructure networks, each network forming different layers in the geographic area for design of the fibre optic network.

In an embodiment, the method facilitates speedy design of the network, requiring less infrastructure to be constructed by reusing existing infrastructure where optimal, by virtue of performing the fibre optic network design method with a computational device (e.g. a server). That is, the method minimises the monetary construction cost of the designed network, and by keeping the cost to a minimum unnecessary infrastructure is advantageously not included in the design.

In an example, in use, the method is more time effective than known design methods and, for example, each performance of the fibre optic network design method takes minutes, compared with manual methods which can take weeks.

In an additional embodiment, the method facilitates speedy redesign by facilitating the altering of the design inputs and re-performing the fibre optic network design method using the altered inputs.

In an embodiment, the method further comprises electronically receiving said fibre optic network design inputs further comprising data indicative of a plurality of arcs extending between said nodes and each of said premises. In the embodiment, the arcs comprise or correspond to at least one fibre optic cable. It will be appreciated by those persons skilled in the art that each premise comprises a demand for one or more individual fibres of the fibre optic cable based on their allocated bandwidth.

In an embodiment, the nodes comprise or correspond to Fibre Distribution Hubs (FDHs) or fibre optic cable splice locations. It will be appreciated by those persons skilled in the art that each FDH is allocated a capacity given by the amount of individual fibres of the fibre optic cables that can be handled thereat. Thus, each FDH is allocated a number of premises to supply optic fibres to.

In an embodiment, the method further comprises estimating said plurality of nodes and said arcs in the fibre optic network based on said allocated bandwidth for said premises in the geographic area. For example, in use, a network designer will estimate the location of the nodes and arcs of the network based on the allocated bandwidth for premises and their location in the geographic area, and this estimate forms the fibre optic network design input data. The estimated location is then optimised by performing optimisation on these inputs with respect to inputs indicative of the existing infrastructure to reuse existing infrastructure to minimise construction costs of the network.

In an embodiment, the existing infrastructure comprises a power network and said optimised geographic locations of said nodes comprises a plurality of power poles of the power network so that said at least one fibre optic cable can be hung therebetween, thereby forming the optimised geographic locations of said arcs. In another embodiment, the existing infrastructure further comprises a duct network having a plurality of pits and a plurality of existing ducts therein and said optimised geographic locations of said nodes further comprises said plurality of pits of the duct network so that said fibre optic cables can be laid in said existing ducts therebetween, thereby further forming the optimised geographic locations of said arcs. That is, the FDHs and cable splice locations can be located at the power poles or pits so that arcs of fibre optic cables can be hung therebetween or laid therebetween to minimise construction costs associated with digging trenches for new ducts.

In an embodiment, the optimised geographic locations of said arcs further comprises new ducts, not of the duct network, so that said fibre optic cables can be laid therein, between said nodes and between said nodes and said premises, where said existing infrastructure cannot be used for the fibre optic network. It will be appreciated by those persons skilled in the art that some new ducts are required where existing infrastructure cannot be conveniently used or does not exist.

In an embodiment, the method further comprises electronically receiving said fibre optic network design inputs further comprising data indicative of costs of said arcs that are to be laid in said new ducts, said existing ducts, and that are to be hung between said power poles. For example, the cost of constructing a new duct is $50/meter, the cost of hanging fibre optic cables between power poles is $2/meter, and the cost of laying fibre optic cables in existing ducts is $5/meter.

In an embodiment, the method further comprises electronically receiving said fibre optic network design inputs further comprising data indicative of costs of said arcs comprising costs associated with a number of said at least one fibre optic cable and length thereof for each of said arcs in the fibre optic network. For example, the cost of fibre optic cable, having a core of eight fibres, is $3/meter, and $5/meter for cable with a core of sixteen fibres.

In an embodiment, the method further comprises electronically receiving said fibre optic network design inputs further comprising data indicative of costs of each of said FDHs and said fibre splice locations for each of said nodes in the fibre optic network. For example, the cost of an FDH with the capability of handling 1000 optical fibres is $50 and the cost of splicing an eight core optical fibre at a splicing location is $2.

In an embodiment, the method further comprises displaying the design of the fibre optic network with respect to a map of the geographic area using the design outputs. The design outputs may be stored in a file and the map may be generated by inputting the file into an appropriate geo spatial application.

In an embodiment, the optimisation model comprises a tree optimisation model whereby each tree is centred at one of said nodes and comprises one or more of said arcs connected thereto. That is, the fibre optic network design includes one or more node arc trees each with cable branches extending from the nodes, where each node relates to a Fibre Distribution Hub (FDH) or a cable splice location and each tree includes a single FDH. It will be appreciated by those persons skilled in the art, however, that other optimisation models can be used such as a spanning tree model.

The optimisation function may combine costs relating to Fibre Distribution Hubs (FDHs), fibre splices, trenching costs, aerial installation costs and cable costs. The constraints may relate to any one or more of: traffic flow requirements at a node, conditional branching of the network, traffic flow requirements of a cable or arc, distance between network components, the available candidate networks (poles, new trenches or existing capacitated trenches) within which the fibre optic network is being installed, and the demand by premise and permitted geographic locations for equipment.

In an embodiment, the design inputs include user defined inputs for the network design, such as those defined by the network designer estimating the network, and generic network inputs for any network design. For example, the user defined inputs include any one or more of an input node domain set relating to allowed geographic location of nodes in the network design, an input arc domain set relating to allowed geographic location of arcs in the network design, an input cable type domain set relating to allowed types of cable to be used in the network design, and an optimisation parameter set for the optimisation model. Also, the generic network inputs include information relating to minimum and maximum number of Fibre Distribution Hubs (FDH) in the network, the capacity (number of fibres connecting to) of each FDH, and network component costs.

According to another aspect of the present invention, there is provided a system for designing a fibre optic network for a plurality of premises in a geographic area that has existing infrastructure, the system comprising:

an input module arranged to receive fibre optic network design inputs comprising data indicative of a plurality of nodes in the fibre optic network and data indicative of arcs extending between said nodes in the fibre optic network based on allocated bandwidth for said premises in the geographic area;

the input module further arranged to receive existing infrastructure design inputs comprising data indicative of said existing infrastructure that can be used as geographic locations for said nodes and said arcs in the fibre optic network;

an optimising module arranged to generate design outputs by optimising geographic locations of said nodes and said arcs in the fibre optic network using said fibre optic network design inputs and said existing infrastructure inputs and using an optimisation model comprising a linear optimisation function subject to linear and integer constraints, wherein said design outputs comprise the optimised geographic locations of said nodes and said arcs in the fibre optic network relative to said existing infrastructure; and an output module arranged to output the design outputs.

In an embodiment, the system further comprises a display module arranged to display the design of the fibre optic network with respect to a map of the geographic area using the design outputs.

According to another aspect of the present invention, there is provided computer program code usable to configure a server to implement a method of designing a fibre optic network for a plurality of premises in a geographic area that has existing infrastructure, the server being configured to:

receive fibre optic network design inputs comprising data indicative of a plurality of nodes in the fibre optic network and data indicative of arcs extending between said nodes in the fibre optic network based on allocated bandwidth for said premises in the geographic area;

receive existing infrastructure design inputs comprising data indicative of said existing infrastructure that can be used as geographic locations for said nodes and said arcs in the fibre optic network;

generate design outputs by optimising geographic locations of said nodes and said arcs in the fibre optic network using said fibre optic network design inputs and said existing infrastructure inputs and using an optimisation model comprising a linear optimisation function subject to linear and integer constraints, wherein said design outputs comprising the optimised geographic locations of said nodes and said arcs in the fibre optic network relative to said existing infrastructure; and output the design outputs.

According to another aspect of the present invention, there is provided computer program code which when executed implements the above described method.

According to another aspect of the present invention, there is provided a computer readable medium comprising the above program code. In an arrangement, the medium, such as a magnetic or optical disk or solid state memory, contains computer readable instructions for execution by a processor to thereby perform the preceding method.

According to another aspect of the present invention, there is provided a data signal comprising the above described program code.

BRIEF DESCRIPTION OF THE DRAWINGS

In order that the invention can be more clearly ascertained, embodiments will now be described, by way of example, with reference to the accompanying drawings, in which:

FIG. 1 is a schematic diagram of an embodiment of the present invention;

FIG. 2 is a flow diagram of an embodiment of the present invention;

FIG. 4 shows, by way of example, a user interface of a network design spreadsheet for a fibre optic network design software product executed on the computational device of FIG. 3;

DETAILED DESCRIPTION

Figure 3:
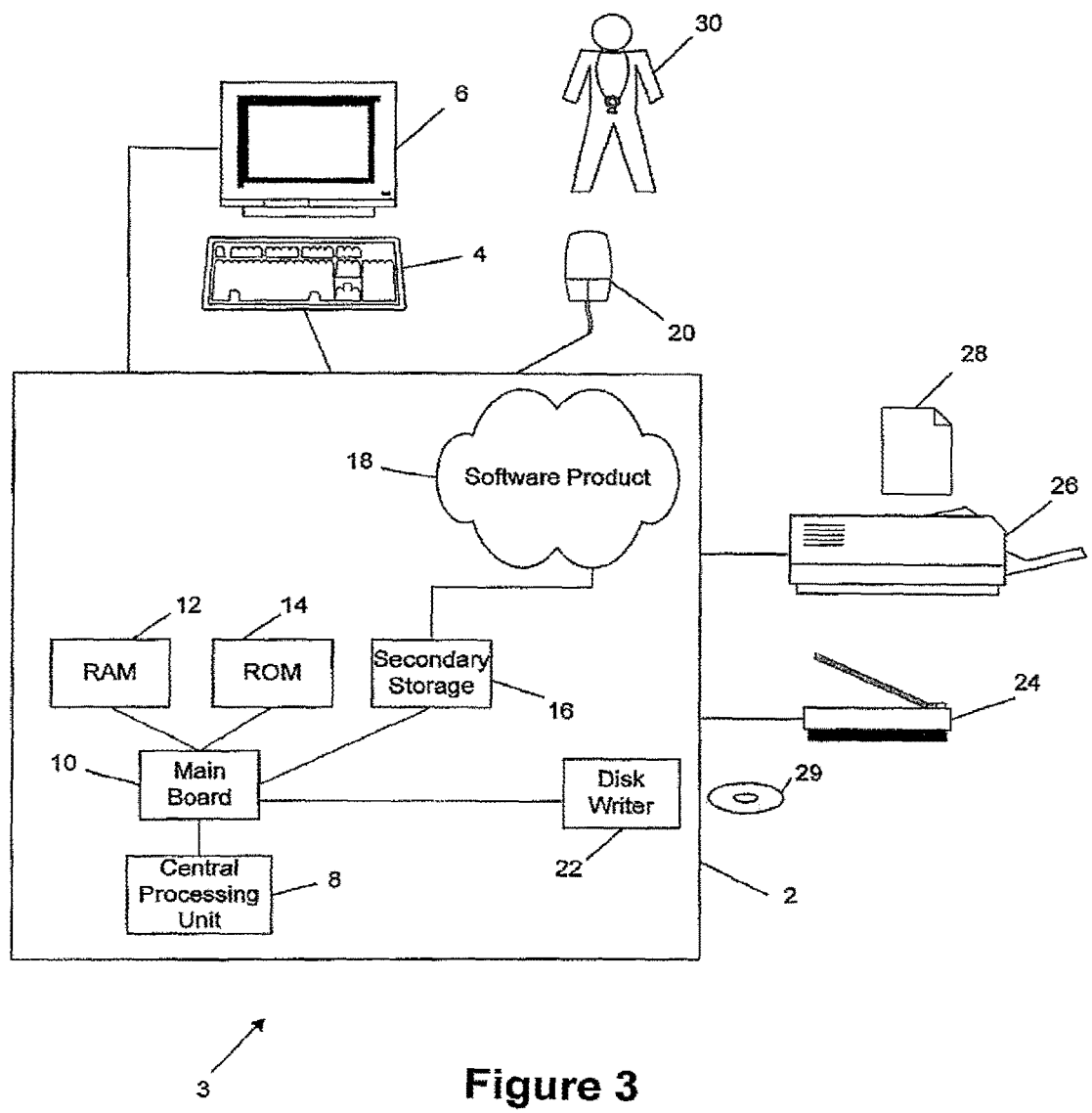
FIG. 3 is a schematic diagram of a computational device according to an embodiment of the present invention.

According to an embodiment of the present invention, there is provided a system 200, as shown in FIG. 1, for designing a fibre optic network for a plurality of premises in a geographic area, such as a suburb, comprising existing infrastructure for utilities in the suburb, such as infrastructure for a power network. The system 200 comprising an input module 202 arranged to receive fibre optic network design inputs comprising data indicative of a plurality of nodes in the fibre optic network and data indicative of a plurality of arcs extending between the nodes in the fibre optic network based on allocated bandwidth for premises in the suburb. The input module 202 is also arranged to receive existing infrastructure design inputs comprising data indicative of the existing infrastructure that can be used as geographic locations for the nodes and arcs in the fibre optic network. The system 200 further includes an optimising module 204 arranged to perform optimisation with respect to the fibre optic network design inputs and the existing infrastructure inputs to optimise the geographic locations of the nodes and the arcs and to generate design outputs comprising the optimised geographic locations of the nodes and arcs in the fibre optic network relative to the existing infrastructure to, for example, minimise costs associated with construction of the fibre optic network. Also, the system 200 includes an output module 206 arranged to output the design outputs for design of the fibre optic network. In this way, the nodes can be located at locations of existing infrastructure, such as power poles, and arcs of fibre optic cables hung therebetween.

In the embodiment shown in FIG. 1, the input 202, optimising 204 and output modules 206 reside on a server 208 accessible by an electronic device 212 over a network 210, such as the Internet. The server 208 comprises a processor 214 arranged to implement the input 202, optimising 204 and output modules 206 and a memory 216 comprising a database 218 to store instructions to perform optimisation using the fibre optic network design inputs and the existing infrastructure inputs to generate the design outputs for output over the network 210 to a user, such as a network designer, of the electronic device 212 (e.g. a computer).

Thus, in use, the network designer estimates the location of the nodes and arcs of the fibre optic network based on the allocated bandwidth for the premises and their location in the geographic area, and the electronic device 212, using a suitable module, generates the fibre optic network design input data based on the estimate, and communicates the input data over the network 210 to the server 208. It is also envisaged that the input 202, optimising 204 and output modules 206 can reside on a stand-alone computing device arranged to facilitate input of the fibre optic network design inputs and output of the design outputs for design of the fibre optic network. In any case, the input module 202 receives the estimates along with data indicative of the existing infrastructure so that the optimising module 204 can perform optimisation on these inputs to generate a network design reusing existing infrastructure to minimise construction costs of the network as described above.

Also as described, the arcs extend between the nodes and each of the premises so that each premise receives at least one optical fibre and each node of the network comprises a Fibre Distribution Hub (FDH) or a fibre optic cable splice location. In the example given below, the existing infrastructure comprises only one utility network: a power network. However, as described above, the system 200 can be applied to more than one utility network (e.g. a power network and telecommunications network) to generate a multi-layered network design reusing different types of existing infrastructure.

In the example, the optimising module 204 performs optimisation on the inputted estimated node and arc location with respect to the location of power poles and underground ducts of the power network to minimise the need to dig new trenches for new ducts for the optic fibre cables. In this way, the nodes of the network can be located at the power poles or underground pits of the power network so that the arcs of fibre optic cable can be hung or laid therebetween. Optimisation is performed by the optimising module 204 on the inputs using an optimisation model in the form of a tree optimisation model, whereby each tree has a FDH centred at one of the nodes and comprises one or more of said arcs connected thereto. This model can be expressed as a linear optimisation function subject to a number of linear and integer constraints, which is as follows:

$$\text{minimise } C^H \sum_{p \in H} z_p + C^S \sum_{p \in H} w_p + \sum_{a \in A, t \in T} C_{at}^A y_{at}$$

Subject to the constraints:

$$M^H z_p + \sum_{a, T_a = p} x_a \geq D_p + \sum_{a, F_a = p} x_a \quad \forall \, p \quad (1)$$

$$z_p + \sum_{t, a, T_a = p} y_{at} = 1 \quad \forall \, p, D_p > 0 \quad (2a)$$

$$\sum_{t, a, T_a = p} y_{at} \leq 1 \quad \forall \, p, D_p = 0 \quad (2b)$$

$$z_p d_p + w_p (d_p - 1) + \sum_{a, T_a = p} y_{at} \geq \sum_{a, F_a = p} y_{at} \quad \forall \, p, t \quad (3)$$

$$x_a \leq \sum_t M_t y_{at} \quad \forall \, a \quad (4)$$

The optimisation model assumes the following data:

A set of $N^P$ power poles P indexed by p (where the term pole and power pole are used interchangeably).

Each pole has a demand $D_p$—the number of fibres that are needed at this pole

A set of NA possible arcs A indexed by $\alpha$, each going from pole $F_\alpha$ to pole $T_\alpha$.

Each span will correspond to two arcs. The length of arc $\alpha$ is given by $l_\alpha$ The degree of each pole, $d_p$—the number that start at (and end at) pole p The set H of poles which are potential FDH's or Splice locations. A splice location is a location where one cable can be joined to two other cables, usually a larger one into two smaller ones. Note all poles may be allowed to locate an FDH or a splice.

The fixed cost of an FDH—$C^H$.

A set of $N^T$ cable types T indexed by t. Each cable type has a maximum fibre capacity $M_t$. Each arc $\alpha$ has a known cost for being connected by cable type $t = C_{\alpha t}^A$. This is calculated from the type of arc, its length and the type of cable.

$M^H$ is the maximum fibre capacity for an FDH.

The above variables are defined as follows:

$z_p \in \{0,1\}$, which is 1 if pole p is used as an FDH. By definition $z_p = 0$ if $p \notin H$.

$w_p \in \{0,1\}$, which is 1 if pole p is used as a splice location. By definition $w_p = 0$ if $p \notin H$.

$y_{\alpha t} \in \{0,1\}$, which is 1 if arc $\alpha$ has a cable of type t installed.

$x_\alpha$ which is the "fibre flow" on arc $\alpha$. That is, the number of free fibres that will be available at the end pole.

Constraint (1) ensures that the "fibre flow" into a pole is at least as large as the demand at the pole plus the fibre flow out of the pole. For an FDH, "inwards fibre flow" will be the capacity of the FDH ($M^H z_p$).

Constraint (2a) ensures that a pole with demand is either an FDH or it has exactly one cable connecting in to it. If a pole has no demand, it must have at most one cable connecting in to it (2b). These constraints, together with the preservation of cable types imposed by constraint (3), ensure that there is no branching in the distribution cable network, except at an FDH or a splice.

Constraint (3) ensures that for each pole the inflow of a particular cable type is at least as large as the outflow of that cable type, unless the pole is an FDH or a splice.

Constraint (4) ensures that the "fibre flow" on an arc is less than the maximum for the installed cable.

Thus, the optimisation function can be seen as minimising the combined construction cost of installed FDH's, splices and the cost of installing cables between nodes and between nodes and premises by utilising existing infrastructure where possible rather than, say, digging new trenches for the arcs of the network. The design outputs from the optimisation function can then applied to a map of the suburb for construction of the network.

Referring now to FIG. 3, there is depicted a block diagram of a conventional computational device 3 of a type suitable for performing the method according to a preferred embodiment of the present invention. That is, FIG. 3 depicts the embodiment where the input 202, processing 204 and output 204 modules of FIG. 1 reside on the computational device 3.

The computational device 3 of FIG. 3 includes a computer case 2 which houses a processor 8 (or one or more processors) that accesses RAM 12, ROM 14 and various secondary data storage devices 16 such as hard disk drives. The processor 8 executes a software product 18 stored in data storage 16 that contains instructions for performing the above described fibre optic network design method. In this embodiment, the input 202, processing 204 and output 204 modules of FIG. 1 are implemented by the software product 18.

The fibre optic network design software product 18 for designing fibre optic networks can be executed using a personal computer (PC), which is a form of the computational device 3, and the software product 18 can update outputs when desired network design inputs are varied by a network designer. The fibre optic network design software product 18 is also provided on an optical or magnetically readable medium, such as a CD-ROM 29, though it might also be provided in a ROM or other electronic circuit as firmware or provided over a distributed computer network such as the Internet. The software product 18 also includes instructions for the computational device 3 to implement the fibre optic network design method.

By means of conventional interfacing circuitry located on a main board 10 within the case 2, the processor 8 receives commands from input devices such as a keyboard 4 and mouse 20. The processor 8 also controls and communicates with a number of peripheral devices including a scanner 24, for converting documents into electronic file format, a printer 26 for converting files, spreadsheets and maps into paper hardcopy 28, and an optical disk writer 22 for permanently writing files, spreadsheets and maps to a removable optical disk 29. The processor 8 also communicates with remote computers via a network support module, such as a LAN switch or Internet gateway.

In use, the computer system 3, executing the software product 18, receives design inputs from the fibre optic network designer 30, for example using the keyboard 4 and the mouse 20, relating to the network design and the existing infrastructure. That is, the designer 30 enters the inputs into the software product 18, which is displayed on the display 6 of the computational device 3. The computational device 3 then performs calculations for the optimisation model based on the inputs from the designer 30 and produces design outputs relating to the network design, which are displayed on the display 6 of the computational device 3 and stored in a file on the data storage device 16.

FIG. 4 shows, by way of example, a user interface 50 for the software product 18, generated by the software product 18, which was executed on the computational device 3. The user interface 50 includes designer defined inputs 52 for a given network design and generic network inputs 54 (or parameters) for any network design, including the fibre optic network design inputs and the existing infrastructure design inputs, and design outputs 56 as indicated below.

The designer defined inputs 52 include a node domain set 58 relating to feasible geographic location of nodes. In practice, these may be a set of usable power poles of the existing power infrastructure in the geography being modelled, or they may be a set of nodes representing street junction points or intersections. The inputs 52 also include the number of fibres that have to be delivered to each node in the network design (e.g. demand) and an arc domain set 60 relating to feasible geographic location of arcs, which can be used to connect nodes with cables of a specific type. In practice, the arc domain set 60 can either be defined by the set of power poles that are connected by existing electrical infrastructure, or the pre existing duct network which may be available for use, or they can represent the connection between nodes representing street junctions or intersections to host new trenched networks, or a combination thereof. The inputs 52 further include a cable type domain set 62 relating to feasible types of cable to be used in the network design, and an optimisation model parameter set 64 for the optimisation model.

The generic network inputs 54 include information relating to the minimum and maximum number of Fibre Distribution Hubs in the network 70, the fibre capacity of each FDH 72 (the maximum number of fibres connect to a FDH), the maximum distance from an FDH to a node, the allowable consumable capacity of fibres in the allowable cable set, the entry point of the distribution cable into the area being planned 87, whether splicing is allowed 88, the number of fibres per tube in accordance with the reference architecture 91, whether or not the solution must include only trenched cable, or a combination of both trenched and aerial cable and network component costs 76. The network component costs 76 include the fixed cost of each FDH 78, splice enclosure costs 80, the fixed cost of an individual fibre splices and splice enclosure pits 82, aerial cable installation cost (per meter) 84, trenching costs (per meter), hauling fibre through trenched ducts (cost per meter) 86 and cable costs (per meter).

The base data required is the location of nodes, the fibre demand for each node, and a determination of whether the node can act as an FDH or cable splice location. These data sets also have a number of spans or arcs—potential connection between nodes. Spans can be thought of as undirected potential arcs that may or may not be used in the output design. Each potential arc includes a determination of whether or not it can be used to string aerial cable only, run trenched cable only, or string both aerial and run trenched cable.

Design outputs 56 include an output node set 88 relating to optimised geographic location of FDHs and cable splice nodes in the network design and an output arc set 90 relating to optimised use of arcs in the network design, including whether or not each arc is used to string aerial cable only, run new trenched cable only, utilize pre existing duct capacity only, or both string aerial and run trenched cable (new or pre existing). Also, the design outputs include the type of cable used and the utilized capacity in each specific cable.

Figure 5:
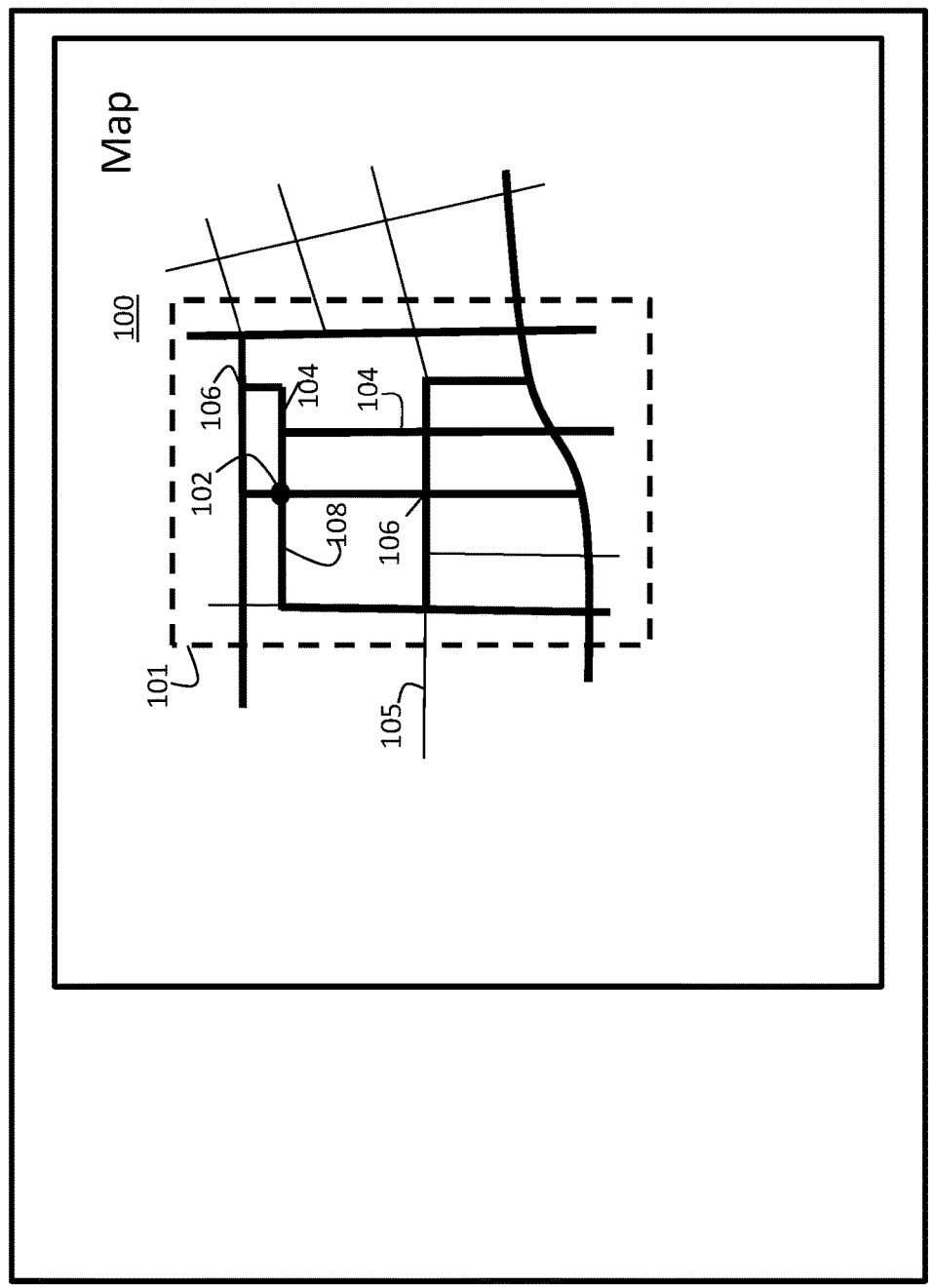
FIG. 5 shows a map of a fibre optic network design produced by an embodiment of the invention, the map being displayed using design outputs produced using the network design spreadsheet of FIG. 4.

The cost optimisation model thus determines a suitable fibre optic network design 20 with a minimum number of components and therefore minimum cost. Referring to FIG. 5, the fibre optic network design 100 includes one or more disconnected trees 101 each with cable branches extending from nodes located at street 108 intersections. The fibre optic network design 100 is obtained using a display module (not shown) arranged to display the design of the fibre optic network with respect to a map of the geographic area using the design outputs.

The tree 101 shown in FIG. 5 includes one FDH 102, which is the fibre connection node for cables 104 in the network 100. Also, splices 106 join two cables together to form a continuous optical waveguide. As described, the tree can only branch at nodes which are either the FDH 102 or splices 106 and the cable connection between nodes is achieved by stringing aerial cable, running trenched cable, or both stringing aerial and running trenched cable along an arc. In practice, there is a cost incurred for every arc and node in the network design depending on how the arc is used to connect the nodes at either end of the arc with cable 100. It can be seen that not all streets 105 have been designed to have cable deployed and arcs to individual premises are not shown.

Figure 6:
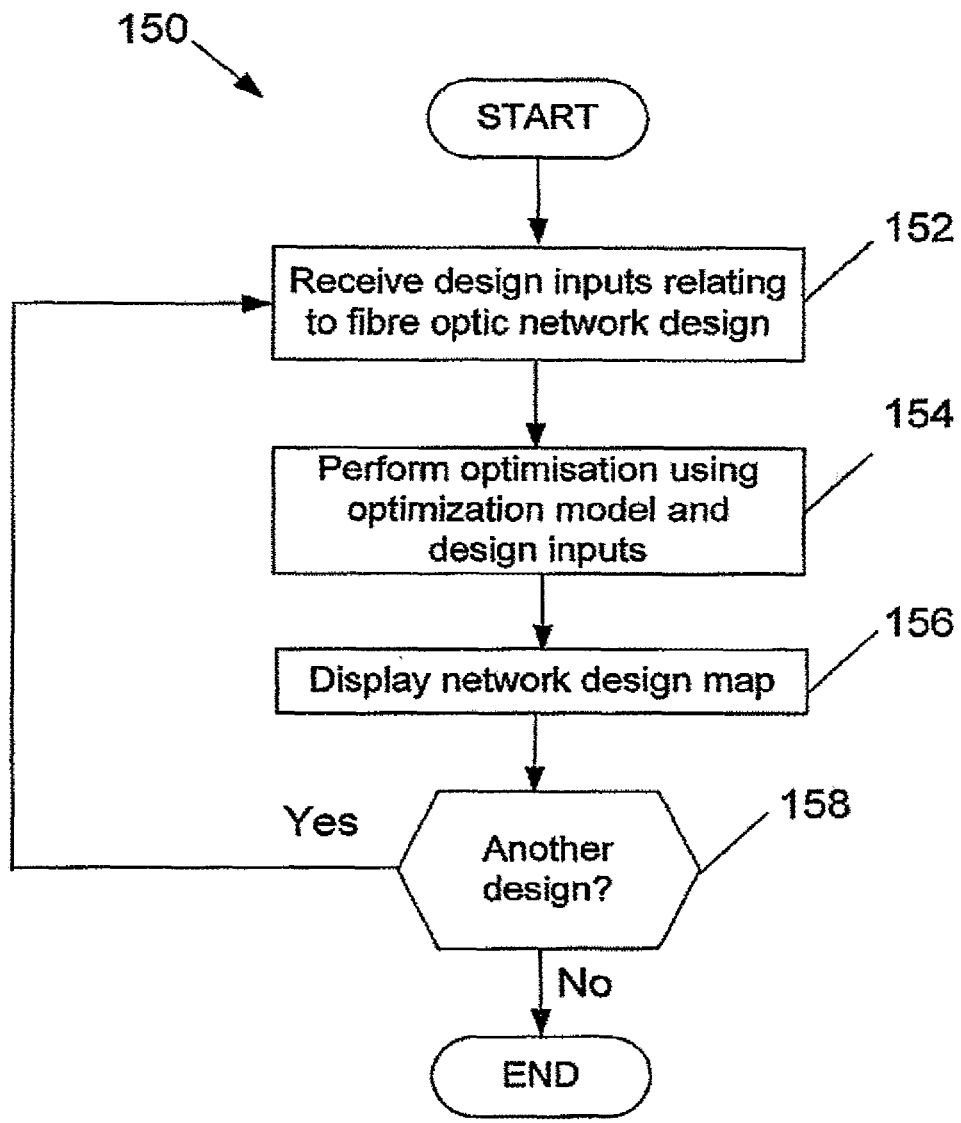
FIG. 6 is a flow diagram of a fibre optic network design method in accordance with an embodiment of the present invention.

In use, the fibre optic network design 100 shown in FIG. 5 is obtained using an embodiment of the method 150 of designing an optical fibre network shown in FIG. 6. Here it can be seen that the software product 18 described above: receives 152 design inputs relating to fibre optic network design including sets of feasible node and arc locations based on, for example, bandwidth allocation for premises in the suburb and existing infrastructure information, performs optimisation 154 by applying the above described optimisation model with respect to the inputs, and displays 156 a map of the fibre optic network design 100 using the optimised outputs. The designer can then repeat 158 the designing process for another fibre optic network design 100.

Referring back to FIG. 2, there is shown a summary of a method 220 of designing a fibre optic network for a plurality of premises in a geographic area. The method 220 comprises receiving 222 fibre optic network design inputs comprising data indicative of a plurality of nodes in the fibre optic network and data indicative of a plurality of arcs extending between the nodes in the fibre optic network based on allocated bandwidth for the premises in the geographic area, receiving 224 existing infrastructure design inputs comprising data indicative of the existing infrastructure that can be used as geographic locations for the nodes and the arcs in the fibre optic network, generating 226 design outputs by optimising the geographic location and the nodes and the arcs using the fibre optic network design inputs and the existing infrastructure inputs, whereby the design outputs comprise the optimised geographic locations of the nodes and the arcs in the fibre optic network relative to the existing infrastructure to, for example, minimise costs associated with construction of the fibre optic network, and outputting 228 the design outputs for design of the fibre optic network.

Further aspects of the method 220 will be apparent from the above description of the system 200. Persons skilled in the art will appreciate that the method could be embodied in program code, executed by a processor, which could be supplied in a number of ways, for example on a computer readable medium, such as a disc or a memory, or as a data signal, such as by transmitting it from a server. Persons skilled in the art will also appreciate that program code provides a series of instructions to implement the method.

It will also be understood to those persons skilled in the art of the invention that many modifications may be made without departing from the spirit and scope of the invention.

It will also be understood that the reference to any prior art in this specification is not, and should not be taken as an acknowledgement or any form of suggestion that the prior art forms part of the common general knowledge in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A computer system executed method for automatically designing a fibre optic network for a plurality of premises in a geographic area that has existing infrastructure for one or more utilities in the geographic area, the method being executed by a computer system comprising a processor, an input module, an optimisation module executable by the processor and an output module, the method comprising:
   electronically receiving by the input module fibre optic network design inputs comprising data indicative of a plurality of nodes in the fibre optic network and data indicative of arcs describing connections extending between said nodes in the fibre optic network based on allocated bandwidth for said premises in the geographic area;
   electronically receiving by the input module existing infrastructure design inputs comprising data indicative of said existing infrastructure that can be used as geographic locations for said nodes and said arcs in the fibre optic network;
   electronically generating design outputs automatically by the system executing the optimisation module which performs optimisation with respect to the fibre optic network design inputs and the existing infrastructure inputs using an optimisation model to optimise geographic locations of said nodes and said arcs in the fibre optic network relative to the existing infrastructure, using said fibre optic network design inputs and said existing infrastructure inputs, the optimisation model comprising a linear optimisation function subject to linear and integer constraints, wherein said design outputs comprise output node data relating to optimised geographic locations of said nodes and output arc data relating to optimised use of said arcs in the fibre optic network relative to said existing infrastructure; and
   electronically outputting the design outputs by the output of the system for construction of the network,
   wherein said existing infrastructure comprises one or more non-fibre networks.

2. The method as claimed in claim 1, wherein said fibre optic network design inputs further comprise data indicative of a plurality of arcs extending between said nodes and each of said premises.

3. The method as claimed in claim 2, wherein:
   i) each of said arcs comprises at least one fibre optic cable;
   ii) said nodes comprise Fibre Distribution Hubs (FDHs) or fibre optic cable splice locations; or
   iii) each of said arcs comprises at least one fibre optic cable and said nodes comprise Fibre Distribution Hubs (FDHs) or fibre optic cable splice locations.

4. The method as claimed in claim 1, wherein said existing infrastructure comprises:
   a power network, wherein said optimised geographic locations of said nodes comprises a plurality of power poles of the power network so that at least one fibre optic cable can be hung therebetween.

5. The method as claimed in claim 1, wherein said existing infrastructure comprises a duct network having a plurality of pits and a plurality of existing ducts therein, said optimised geographic locations of said nodes further comprise said plurality of pits of the duct network so that fibre optic cables can be laid in said existing ducts therebetween, and said optimised geographic locations of said arcs further comprise new ducts, not of the duct network, so that said fibre optic cables can be laid therein where said existing infrastructure cannot be used for the fibre optic network.

6. The method as claimed in claim 1, wherein said fibre optic network design inputs further comprise data indicative of costs.

7. The method as claimed in claim 1, further comprising:
   i) displaying by the system using the output the design of the fibre optic network with respect to a map of the geographic area using the design outputs; and/or
   ii) estimating by the optimisation module said plurality of nodes and said arcs in the fibre optic network based on said allocated bandwidth for said premises in the geographic area.

8. The method as claimed in claim 1, wherein said optimisation model comprises a tree optimisation model whereby each tree is centred at one of said nodes and comprises one or more of said arcs connected thereto.

9. The method as claimed in claim 1, wherein said existing infrastructure comprises a duct network having a plurality of pits and a plurality of existing ducts therein, wherein said optimised geographic locations of said nodes further comprise said plurality of pits of the duct network so that fibre optic cables can be laid in said existing ducts therebetween.

10. A non-transitory computer readable storage medium on which is encoded computer program code which when executed implements the method of claim 1.

11. A computing system configured to automatically design a fibre optic network for a plurality of premises in a geographic area that has existing infrastructure for one or more utilities in the geographic area, the system comprising:
   a processor;
   an input module arranged to electronically receive fibre optic network design inputs comprising data indicative of a plurality of nodes in the fibre optic network and data indicative of arcs describing connections extending between said nodes in the fibre optic network based on allocated bandwidth for said premises in the geographic area;
   the input module further arranged to electronically receive existing infrastructure design inputs comprising data indicative of said existing infrastructure that can be used as geographic locations for said nodes and said arcs in the fibre optic network;

an optimising module executable by the processor to automatically generate design outputs by performing optimisation with respect to said fibre optic network design inputs and said existing infrastructure inputs using an optimisation model to optimise geographic locations of said nodes and said arcs in the fibre optic network relative to the existing infrastructure, using said fibre optic network design inputs and said existing infrastructure inputs and using the optimisation model comprising a linear optimisation function subject to linear and integer constraints, wherein said design outputs generated by the optimisation module comprise output node data relating to optimised geographic locations of said nodes and output arc data relating to optimised use of said arcs in the fibre optic network relative to said existing infrastructure; and an output arranged to output the design outputs for the construction of the fibre optic network, wherein said existing infrastructure comprises one or more non-fibre networks.

12. The system as claimed in claim 11, wherein said fibre optic network design inputs further comprise data indicative of a plurality of arcs extending between said nodes and each of said premises.

13. The system as claimed in claim 11, wherein:
i) each of said arcs comprise at least one fibre optic cable;
ii) said nodes comprise Fibre Distribution Hubs (FDHs) or fibre optic cable splice locations; or
iii) each of said arcs comprise at least one fibre optic cable and said nodes comprise Fibre Distribution Hubs (FDHs) or fibre optic cable splice locations.

14. The system as claimed in claim 11, wherein said existing infrastructure comprises: a power network, wherein said optimised geographic locations of said nodes comprises a plurality of power poles of the power network so that at least one fibre optic cable can be hung therebetween, thereby forming the optimised geographic locations of said arcs.

15. The system as claimed in claim 11, wherein said existing infrastructure comprises a duct network having a plurality of pits and a plurality of existing ducts therein, said optimised geographic locations of said nodes further comprises said plurality of pits of the duct network so that at least one fibre optic cable can be laid in said existing ducts therebetween, thereby further forming the optimised geographic locations of said arcs, said optimised geographic locations of said arcs further comprise new ducts, not of the duct network, so that said fibre optic cables can be laid therein where said existing infrastructure cannot be used for the fibre optic network.

16. The system as claimed in claim 11, wherein said fibre optic network design inputs comprise data indicative of costs.

17. The system as claimed in claim 11, wherein:
i) said system further comprises a display module arranged to display the design of the fibre optic network with respect to a map of the geographic area using the design outputs; and/or
ii) said plurality of nodes and said arcs in the fibre optic network is estimated based on said allocated bandwidth for said premises in the geographic area.

18. The system as claimed in claim 11, wherein said optimisation model comprises a tree optimisation model whereby each tree is centred at one of said nodes and comprises one or more of said arcs connected thereto.

19. The system as claimed in claim 11, wherein said existing infrastructure comprises a duct network having a plurality of pits and a plurality of existing ducts therein, wherein said optimised geographic locations of said nodes further comprises said plurality of pits of the duct network so that at least one fibre optic cable can be laid in said existing ducts therebetween, thereby further forming the optimised geographic locations of said arcs.

20. A non-transitory computer readable storage medium on which is encoded computer program code configured to control a server to execute a method of designing a fibre optic network for a plurality of premises in a geographic area that has existing infrastructure, the computer program code being configured to control the server to:
electronically receive fibre optic network design inputs comprising data indicative of a plurality of nodes in the fibre optic network and data indicative of arcs extending between said nodes in the fibre optic network based on allocated bandwidth for said premises in the geographic area;
electronically receive existing infrastructure design inputs comprising data indicative of said existing infrastructure that can be used as geographic locations for said nodes and said arcs in the fibre optic network;
generate design outputs automatically by optimising geographic locations of said nodes and said arcs in the fibre optic network using said fibre optic network design inputs and said existing infrastructure inputs and using an optimisation model comprising a linear optimisation function subject to linear and integer constraints, wherein said design outputs comprise the optimised geographic locations of said nodes and said arcs in the fibre optic network relative to said existing infrastructure; and
output the design outputs,
wherein said existing infrastructure comprises one or more non-fibre networks.

21. The non-transitory computer readable medium comprising the computer program code of claim 20 or design outputs generated by execution of computer program code of claim 20.

* * * * *